(12) United States Patent  
Frankel et al.

(10) Patent No.: US 10,212,496 B2  
(45) Date of Patent: Feb. 19, 2019

(54) HIGH PORT COUNT SWITCHING MODULE, APPARATUS, AND METHOD

(71) Applicant: Ciena Corporation, Hanover, MD (US)

(72) Inventors: Michael Y. Frankel, Bethesda, MD (US); John P. Mateosky, West River, MD (US); Vladimir Pelekhaty, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 14/924,802

(22) Filed: Oct. 28, 2015

(65) Prior Publication Data

US 2017/0127157 A1    May 4, 2017

(51) Int. Cl.  
*H04Q 11/00* (2006.01)

(52) U.S. Cl.  
CPC . *H04Q 11/0005* (2013.01); *H04Q 2011/0018* (2013.01); *H04Q 2011/0058* (2013.01)

(58) Field of Classification Search  
CPC .................................................. H04Q 11/0005  
See application file for complete search history.

(56) References Cited

U.S. PATENT DOCUMENTS

| 9,124,383 | B1 | 9/2015 | Frankel et al. | |
|---|---|---|---|---|
| 2007/0291535 | A1* | 12/2007 | Eberle | H04L 49/109 365/174 |
| 2008/0075071 | A1 | 3/2008 | Beshai | |
| 2009/0147896 | A1 | 6/2009 | Frankel et al. | |
| 2012/0106117 | A1 | 5/2012 | Sundaram et al. | |
| 2012/0177381 | A1* | 7/2012 | Dobbelaere | H01L 21/84 398/139 |
| 2012/0189245 | A1* | 7/2012 | Bowen | G02B 6/4214 385/14 |
| 2013/0082364 | A1* | 4/2013 | Wang | H01L 23/3128 257/659 |
| 2013/0108259 | A1 | 5/2013 | Srinivas et al. | |
| 2013/0108263 | A1 | 5/2013 | Srinivas et al. | |
| 2013/0119555 | A1 | 5/2013 | Sundaram et al. | |
| 2013/0242493 | A1 | 9/2013 | Shenoy et al. | |

(Continued)

OTHER PUBLICATIONS

"DCS7032Q28 Data Center Switch Data Sheet", Inventec, 2014, pp. 1-4.

(Continued)

*Primary Examiner* — Shi K Li  
(74) *Attorney, Agent, or Firm* — Clements Bernard Walker PLLC; Christopher L. Bernard; Lawrence A. Baratta, Jr.

(57) ABSTRACT

A high port count switching module includes a plurality of switching circuits disposed on a glass interposer, wherein the plurality of switching circuits each include cross-point switches configured to perform switching at a full signal rate; and a plurality of optical transceivers disposed on the glass interposer and communicatively coupled to the plurality of switching circuits. The glass interposer has i) a low dielectric loss, relative to a silicon, organic, or ceramic interposer, to allow wideband data transmission, ii) a smooth surface, resulting in smooth metal traces to minimize high-frequency skin effect loss, iii) a coefficient of thermal expansion that is matched to the plurality of switching circuits to minimize stresses, and iv) thermal isolation among the plurality of switching circuits due to low thermal conductivity of glass.

17 Claims, 5 Drawing Sheets

(56) References Cited

U.S. PATENT DOCUMENTS

| | | | |
|---|---|---|---|
| 2013/0287397 A1 | 10/2013 | Frankel et al. | |
| 2014/0049932 A1 | 2/2014 | Camarota | |
| 2014/0077364 A1* | 3/2014 | Marimuthu | H01L 23/5389 257/737 |
| 2014/0145328 A1 | 5/2014 | Tummala et al. | |
| 2014/0270762 A1* | 9/2014 | Li | H04L 45/02 398/45 |
| 2015/0041189 A1 | 2/2015 | Lasiter et al. | |
| 2015/0076923 A1 | 3/2015 | Frankel et al. | |
| 2015/0235921 A1 | 8/2015 | Shen | |
| 2016/0056945 A1* | 2/2016 | Ella | H04B 1/525 370/273 |
| 2016/0085038 A1* | 3/2016 | Decker | G02B 6/4204 385/14 |

OTHER PUBLICATIONS

Farrington et al., "Helios: A Hybrid Electrical/Optical Switch Architecture for Modular Data Centers", SIGCOMM'10, Aug. 30-Sep. 3, 2010, pp. 1-12.

HighDensity 25/100 Gigabit Ethernet StrataXGS® Tomahawk Ethernet Switch Series BCM56960 Series, Broadcom, https://www.broadcom.com/support/?gid=9, Oct. 21, 2015.

Doyle et al., "Lessons from Altoona: What Facebook's newest data center can teach us", big switch networks, pp. 1-5.

"Breakthrough Operational Efficiency Improvement for Data Centers", CALIENT Technologies, http://www.calient.net/solutions/lightconnectfabricvirtualpoddatacenters/, Oct. 21, 2015, pp. 1-2.

"32-port Non-blocking 100GbE Open Ethernet Switch System", Mellanox Technologies, 2015, pp. 1-2.

* cited by examiner

FIG. 5

HIGH PORT COUNT SWITCHING MODULE, APPARATUS, AND METHOD

FIELD OF THE DISCLOSURE

The present disclosure generally relates to networking systems and methods. More particularly, the present disclosure relates to a high port count switching module, apparatus, and method, targeting a switch elements capable of tens of terabits per second (Tbps) capacity in an extremely dense package with low power dissipation.

BACKGROUND OF THE DISCLOSURE

Conventional data center switches are typically built using packet switches. The packet switches are implemented with various electrical circuitry, such as Application Specific Integrated Circuits (ASICs). For example, a conventional packet switch providing 128×128 ports at 28 Gbps has each ASIC consuming about 150 W. For optical input/output, 4×28 G QSFP28 pluggable transceivers can be used, resulting in a 3.2 Tbps switch, excluding overhead. Another conventional switch is IBM's Torrent-based switch designed for high-performance computing. It uses packaged devices mounted on a ceramic substrate and a single packaged die. This configuration uses 28 optical Vertical Cavity Surface Emitting Lasers (VCSELs) transceivers each with 12 channels at 10 Gbps, for a total of 3.36 Tbps bandwidth. Various implementations focus on providing as large as possible switching capacity in a single ASIC, to improve overall network efficiency. Some conventional switching ASICs include the Tomahawk from Broadcom, which consumes close to 200 W of power for 32×100 GbE ports and the Spectrum from Mellanox, which consumes close to 135 W of power for 32×100 GbE ports.

Single Tbps switches and modules need to evolve to support orders of magnitude more bandwidth. One approach proposes the use of VCSELs and photodetectors (PD) directly attached to Complementary Metal-Oxide Semiconductor (CMOS) switching ASICs. This approach has a disadvantage of tightly coupling optical and electronic designs, i.e., a small change in one requires a complete redesign of the whole opto-electro-mechanical system. Also, this approach is likely limited to only using VCSELs and limits the number of implementable fiber connections (i.e., ports).

Figure 1:
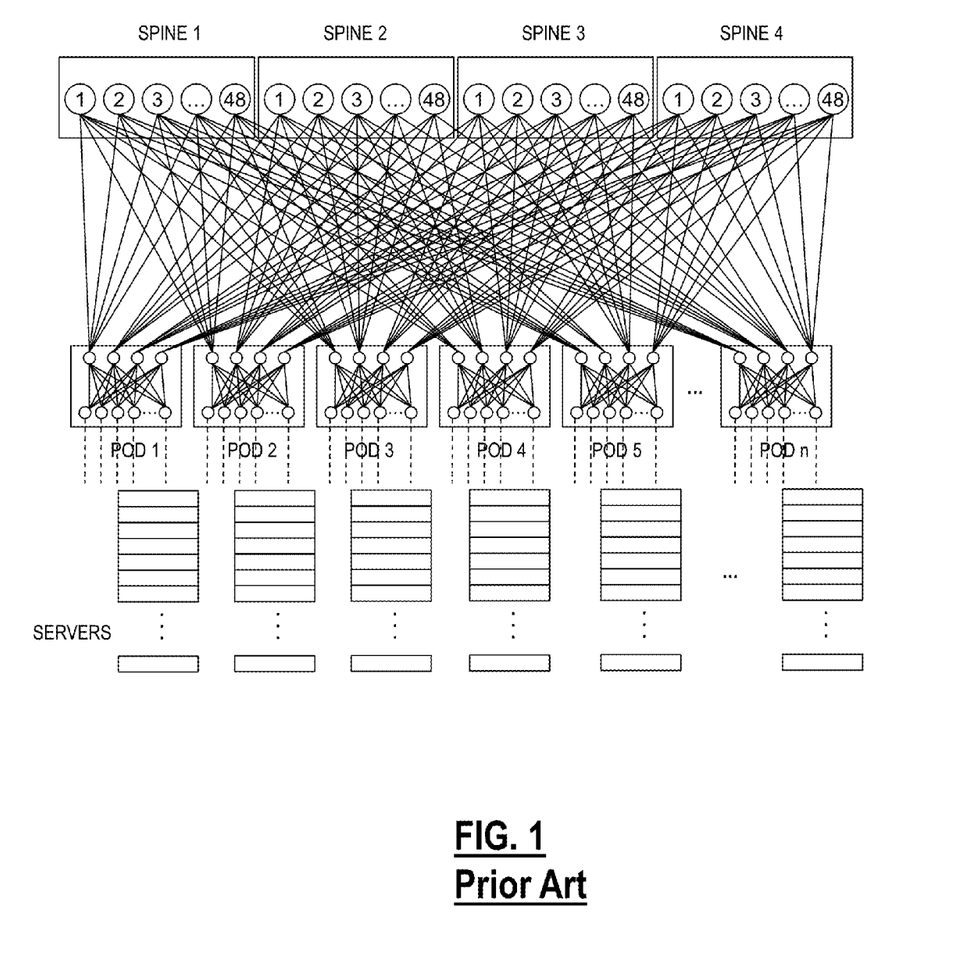
FIG. 1 is a network diagram of a layered data center architecture.

Data centers and the like require network interconnection between thousands of racks, and larger switching fabrics are built up in layers, using the aforementioned hardware. FIG. 1 illustrates a network diagram of a layered data center architecture. The various circles in the Spine and Pods are individual packet switches. As can be seen in FIG. 1, a large fraction of the individual switch ports is spent on internal interconnections for scaling, rather than for providing useful ports to servers. Note, various servers are shown in FIG. 1 connected to the bottom packet switches in the Pods. The power consumption associated with the ASICs and the links associated with these internal interconnections is excess. Stated differently, packet switching is not needed on these internal interconnections.

As such, one approach to streamlining the layered data center architecture is to replace the internal interconnections with all-optical switching. While all-optical switching has advantages of extremely low latency and reduction of optical transceivers, there are various disadvantages such as slow switching and quasi-static connections, increased link budgets from data center transceivers to accommodate switching loss (~3 dB), limited port counts and limited optical cascading due to optical insertion loss, no visibility into digital signals for performance monitoring, label processing, and the like.

BRIEF SUMMARY OF THE DISCLOSURE

In an exemplary embodiment, a high port count switching module includes a plurality of switching circuits disposed on a glass interposer, wherein the plurality of switching circuits each includes cross-point switches configured to perform switching at a full signal rate; and a plurality of optical transceivers disposed on the glass interposer and communicatively coupled to the plurality of switching circuits. A portion of the plurality of switching circuits can be one of i) flip-chip attached to the glass interposer and ii) positioned in wells defined in the glass interposer, and wherein the plurality of switching circuits are interconnected to one another to form a larger switch. The plurality of optical transceivers can be one of i) directly attached to the glass interposer to provide low-loss Radio Frequency (RF) connections and ii) attached to the glass interposer through Radio Frequency (RF) sockets. The glass interposer can include one or more optical waveguides associated with the plurality of optical transceivers. The plurality of optical transceivers and the plurality of switching circuits can be interconnected to one another via a Radio Frequency (RF) redistribution layer on the glass interposer, wherein the RF redistribution layer has very low loss at high frequencies. The glass interposer can have i) a low dielectric loss, relative to a silicon, organic, or ceramic interposer, to allow wideband data transmission, ii) a smooth surface, resulting in smooth metal traces to minimize high-frequency skin effect loss, iii) a coefficient of thermal expansion that is matched to the plurality of switching circuits to minimize stresses, and iv) thermal isolation among the plurality of switching circuits due to low thermal conductivity of glass, relative to a silicon, organic, or ceramic interposer.

The glass interposer has thermal isolation among the plurality of switching circuits due to low thermal conductivity of glass and high local thermal conductivity by copper Through Glass Vias (TGVs) to allow cooling of the plurality of switching circuits. The glass interposer can provide very dense, small pitch via and pad connectivity and very fine line and space (L/S) routing, enabling the high port count electrical signaling, relative to a silicon, organic, or ceramic interposer. Signals switched through the plurality of switching circuits and the plurality of optical transceivers can be at least 25 Gbps such that the glass interposer has low power electronic interconnects, with minimal or no Serializer-DeSerializer (SERDES) functionality and without gearboxes down to lower rates. Transmission lines on the glass interposer, between the plurality of switching circuits and the plurality of optical transceivers, are high-performance, low-loss and do not require transmit side or receive side electrical signal equalizers, and the transmission lines can be single ended with a reduced pin count. The glass interposer can include high Q-factor Radio Frequency (RF) passive devices integrated thereon.

In another exemplary embodiment, a high port count switching apparatus includes a plurality of switching circuits disposed on a glass interposer disposed on a Printed Circuit Board (PCB); a plurality of optical transceivers disposed on the glass interposer and communicatively coupled to the plurality of switching circuits; and a physical housing containing the PCB. A portion of the plurality of switching circuits can be one of i) flip-chip attached to the glass interposer and ii) positioned in wells defined in the glass interposer, and wherein the plurality of switching circuits are interconnected to one another to form a larger switch. The plurality of optical transceivers can be one of i) directly attached to the glass interposer to provide low-loss Radio Frequency (RF) connections and ii) attached to the glass interposer through Radio Frequency (RF) sockets or removable forms. The plurality of optical transceivers and the plurality of switching circuits can be interconnected to one another via a Radio Frequency (RF) redistribution layer on the glass interposer, wherein the RF redistribution layer has very low loss at high frequencies.

The glass interposer can have i) a low dielectric loss, relative to a silicon, organic, or ceramic interposer, to allow wideband data transmission, ii) a smooth surface, resulting in smooth metal traces to minimize high-frequency skin effect loss, iii) a coefficient of thermal expansion that is matched to the plurality of switching circuits to minimize stresses, and iv) thermal isolation among the plurality of switching circuits due to low thermal conductivity of glass, relative to a silicon, organic, or ceramic interposer. The glass interposer can have thermal isolation among the plurality of switching circuits due to thermal conductivity of glass and high local thermal conductivity by copper Through Glass Vias (TGVs) to allow cooling of the plurality of switching circuits. Signals switched through the plurality of switching circuits and the plurality of optical transceivers can be at least 25 Gbps such that the glass interposer has low power electronic interconnects, with minimal or no Serializer-DeSerializer (SERDES) functionality and without gearboxes down to lower rates. Transmission lines on the glass interposer, between the plurality of switching circuits and the plurality of optical transceivers, can be high-performance, low-loss and do not require transmit side or receive side electrical signal equalizers, and the transmission lines are single ended with a reduced pin count.

In a further exemplary embodiment, a high port count switching method includes providing a plurality of switching circuits disposed on a glass interposer, wherein the plurality of switching circuits each includes cross-point switches configured to perform switching at a full signal rate; and providing a plurality of optical transceivers disposed on the glass interposer and communicatively coupled to the plurality of switching circuits.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, a high port count switching module, apparatus, and method, are described targeting a switch elements capable of tens of terabit/sec (Tbps) capacity in an extremely dense package. In an exemplary embodiment, the high port count switching module, apparatus, and method are applicable to support internal interconnections in the layered data center architecture, with reduced power consumption and extremely high density packaging. In a specific exemplary embodiment, the high port count switching module can support in excess of 25 Tbps in a single module. It is an objective of the high port count switching module, apparatus, and method to overcome port count limitations associated with currently available electrical switching devices; to provide flexible, scalable, high bandwidth optical signal connectivity between modules formed with such electrical switching devices; and to provide a technology platform where future large data rate and port count increases are simplified due to intrinsic low power consumption and high Radio Frequency (RF) performance.

Figure 2:
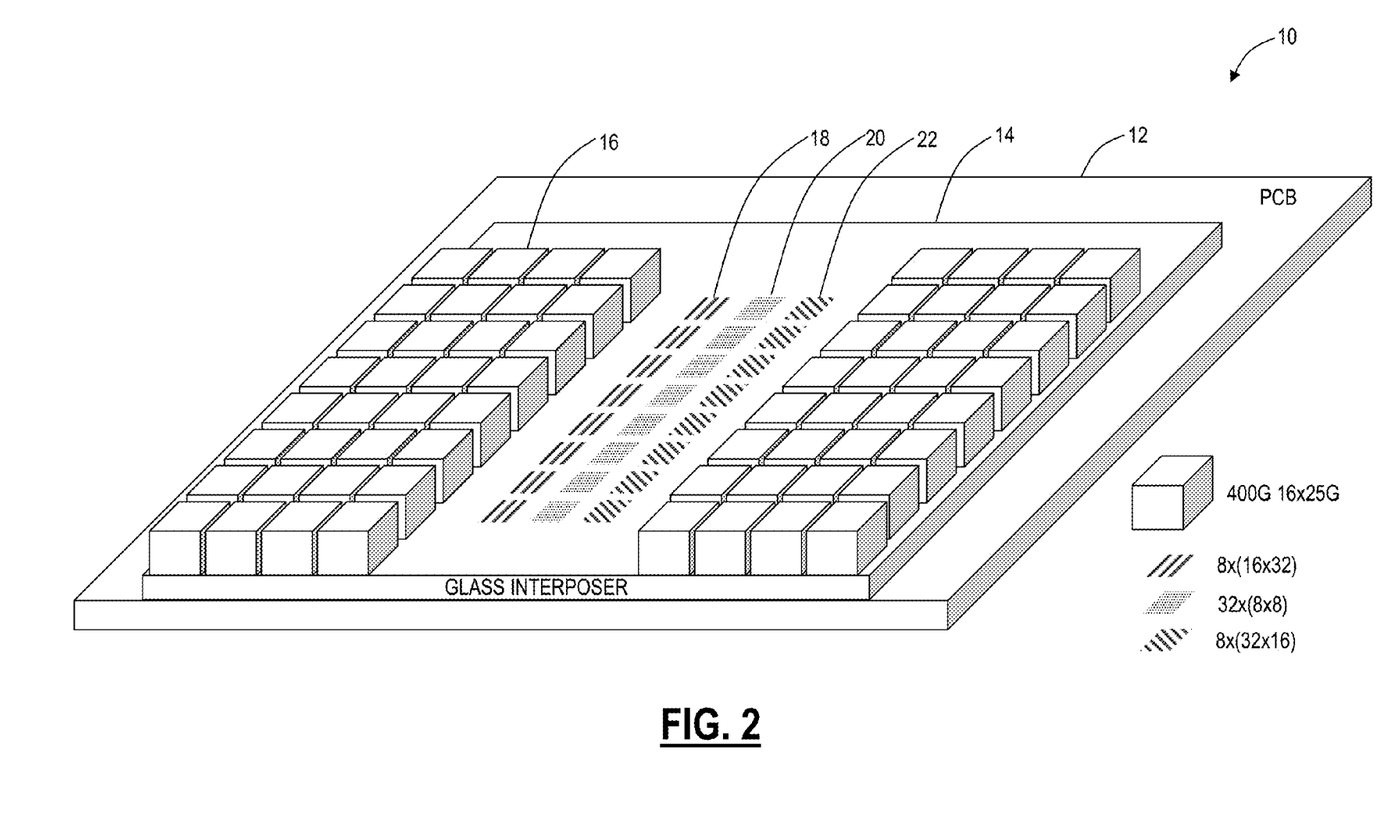
FIG. 2 is a perspective diagram of a high port count switching apparatus.

Referring to FIG. 2, in an exemplary embodiment, a perspective diagram illustrates a high port count switching apparatus 10. The switching apparatus 10 includes a module or board level design approach meeting the aforementioned objectives through co-design of three elements as described herein. The switching apparatus 10, in an exemplary embodiment, can be a high port-count, high-bandwidth electro-optical switching module for data center applications. FIG. 2 is a notional view of the switching apparatus 10. The specific data rate, port count, and component count numbers described herein are for illustrative purposes only; those of ordinary skill in the art will recognize other values are also contemplated. The switching apparatus 10 includes a Printed Circuit Board (PCB) 12, a glass interposer 14, optical transceivers 16, and switching circuitry 18, 20, 22.

Figure 3:
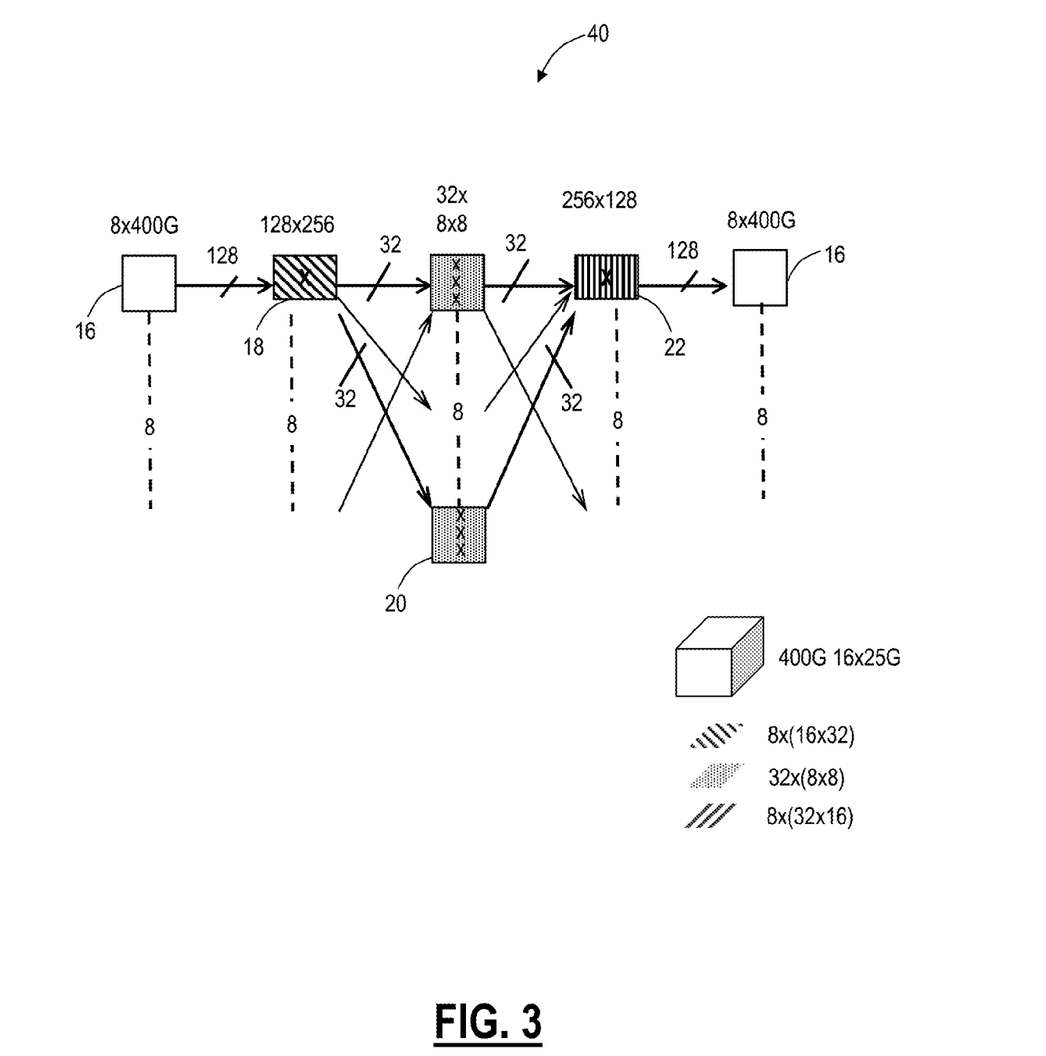
FIG. 3 is a block diagram of element counts and interconnections in the high port count switching apparatus.

In an exemplary embodiment, the switching circuitry 18, 20, 22 is formed from small CMOS switch cells, e.g., 8×8 or similar to build a CMOS die with 8×(16×32) and 32×(8×8) configurations. In the exemplary embodiment of FIG. 2, the switching circuitry 18 are each a 8×(16×32) switch cell, the switching circuitry 20 are each 32×(8×8) switch cells, and the switching circuitry 22 are each a 8×(32×16) switch cell. Referring to FIG. 3, in an exemplary embodiment, a block diagram illustrates an interconnection structure 40 for the high port count switching apparatus 10.

The switching circuitry 18, 20, 22 are disposed on the glass interposer 14, surrounded by and communicatively coupled to the optical transceivers 16. A number of the switching circuitry 18, 20, 22 dies can be flip-chip attached to the glass interposer 14, with an RF redistribution layer used to provide a Clos-type switch interconnect between the input and intermediate switching circuits, as well as between the intermediate and output switching circuits, to produce a 1024×1024 port count scale.

The switching circuitry 18, 20, 22 collectively forms an electronic CMOS-based cross-point switch which consumes much less power than comparable existing switches, i.e., packet fabrics. The electronic switch minimizes power consumption in the switch core by providing very simple cross-point functionality performed at a full signal rate, i.e. 28 Gbps or 56 Gbps, etc. Further, this electronic switch operates on single-ended signals, providing an ability to construct a larger switch matrix by providing large I/O port count. I/O port drivers and clock-and-data recovery are very low power, as the interposer level RF interconnects have a very low loss at high frequencies.

The cross-point switch can be used instead of a packet switch on the ports, i.e., the internal interconnections, between the pods and the spine switches in FIG. 1. For example, a detailed transistor-level design an 8×8 CMOS switch which has a cell size of ~140×140 µm and shown to have a simulated power consumption of ~35 mW in 45 nm CMOS process. Such cells can be tiled together via interconnecting buffers to build larger switch sizes, such as 256×256, 1024×1024, etc., i.e., the switching circuitry 18, 20, 22. Note, the replacement of the packet switch by the cross-point switch is in certain architectures, i.e., application dependent. The cross-point switch can be used to replace a portion of the packet switches in a hybrid fashion, as detailed in various computer/networking architecture papers, whether it is an optical circuit switch or electrical is another matter as well.

Advantageously, the switching circuitry 18, 20, 22 forms a low power electrical switch, with purely cross-point type functionality (no fast Time Division Multiplex (TDM) or Packet functionality). Cross-point switching is performed at high rate granularity, i.e. 25 Gbps for example. With this, the apparatus 10 has low-power electronic chip-to-chip interconnect, with minimal or no Serializer-DeSerializer (SERDES) functionality, i.e. transmission at 25 Gbps without gear-boxes down to lower rates.

An interposer is a substrate, providing routing (electrical, optical, or otherwise) between one component, (i.e., die, IC or socketed device or module) and another. In various exemplary embodiments, the apparatus 10 utilizes the glass interposer 14 instead of a silicon, ceramic, and/or organic interposer. The glass interposer 14 is used to interconnect the switching circuitry 18, 20, 22 to one another and the optical transceivers 16 to the switching circuitry 18, 20, 22

The glass interposer 14 has a relatively low thermal conductivity, thereby thermally isolating individual elements. High-quality heat sinking can be provided from the top (not shown for clarity), and/or by using Cu Through Glass Vias under the devices to the bottom heat sink (not shown for clarity). In the exemplary embodiment of FIG. 2, the end result is a single module providing 25.6 Tbps of switching capacity excluding overhead (1024×1024 ports at 28 Gbps), and with ~20×20 cm dimension and <600 W power consumption.

The glass interposer 14 is a new technology being developed in the industry. It offers superior mechanical stability allowing low dimension, dense electrical interconnect, very low dielectric loss (relative to a silicon, ceramic, and/or organic interposer) allowing wideband data transmission, i.e. 28 and 56 Gbps, very smooth surface, resulting in smooth metal traces, which minimizes high-frequency skin effect loss, low propagation delay, etc. Coefficient of thermal expansion can be matched to CMOS switch dies for the switching circuitry 18, 20, 22, minimizing stresses. Low thermal conductivity of glass provides thermal isolation among dies. High local thermal conductivity by Cu TGVs allows efficient die cooling.

Another significant advantage of TGVs in broadband RF signaling is a lower signal path delay when compared to TSVs (silicon interposers). This is important in systems that need to match channel-to-channel lane skew in the multi-die layout/design. Glass substrates are significantly superior from an RF crosstalk an insertion loss and return loss standpoint (S12 and S11) as well. Glass has many other advantages, e.g., glass can be manufactured to match the Coefficients of Thermal Expansion (CTE) of silicon die exactly, making it a near ideal substrate for direct die attach, this is a critical piece in electro-optic subsystem design.

The glass interposer 14 enables very dense, small pitch via and pad connectivity and very fine line and space (L/S) routing, enabling the high port count electrical signaling.

Also, the glass interposer 14 can include optical turning structures in and/or on the glass interposer 14, allowing incorporation or integration of Single Mode Fiber (SMF) or Multi Mode Fiber (MMF). Here, SMF and/or MMF fiber can be used without a pluggable optical module such as where a Photonic Integrated Circuit (PIC) die is directly attached or disposed on the glass interposer 14. This can be achieved using Vertical Grating Couplers (VGCs) and other structures.

Figure 4:
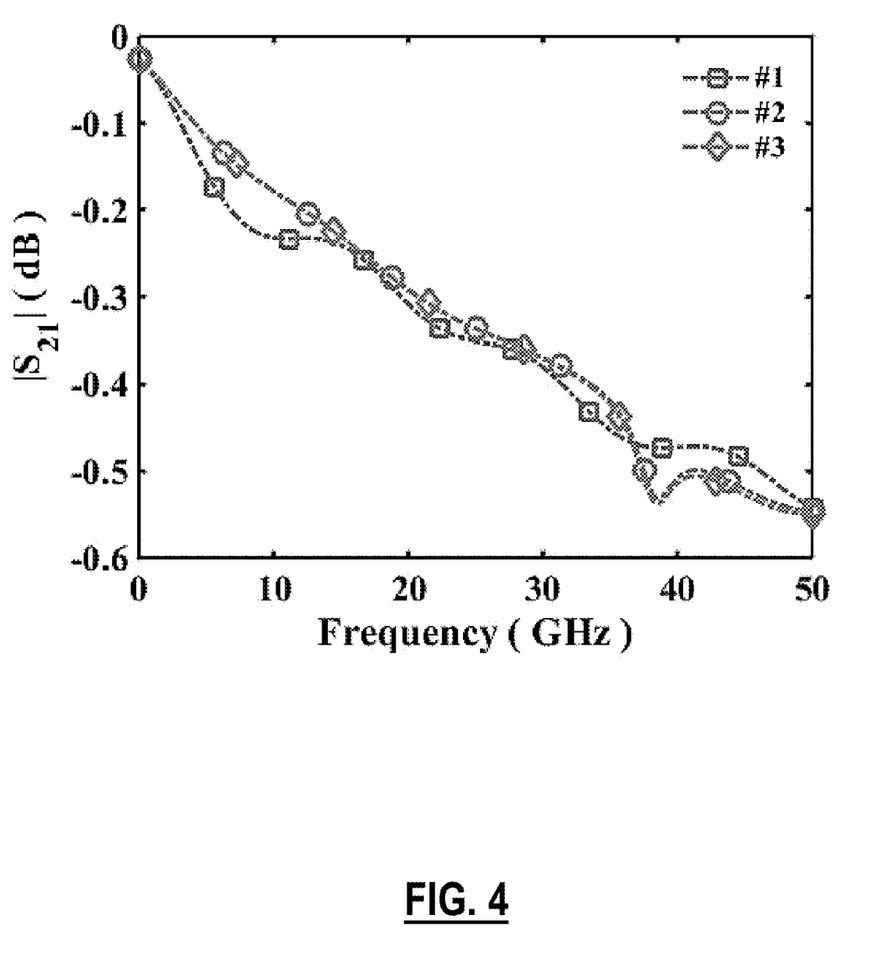
FIG. 4 is a graph of loss versus frequency for the glass interposer.

Detailed 3D-EM simulations (illustrated in FIG. 4 in a graph of loss versus frequency for the glass interposer 14) show losses are quite low up to 50 GHz for a 10 mm long transmission line. A 10 cm transmission line will show losses of ~3 dB at 14 GHz frequency, which is sufficient for a 28 Gbaud signal transmission with minimal distortions.

Again, the glass interposer 14 is a key enabler of the high density interconnection in the apparatus 10, and the glass interposer 14 has the following advantages, for example: a) superior mechanical stability allowing low dimension, dense electrical interconnect, b) very low dielectric loss allowing wideband data transmission, i.e. 25 and 56 Gbps, c) very smooth surface, resulting in smooth metal traces which minimizes high-frequency skin effect loss; d) The coefficient of thermal expansion can be matched to the CMOS die, i.e., the switching circuitry 18, 20, 22, minimizing stresses; e) low glass thermal conductivity, providing thermal isolation among dies; f) High local thermal conductivity by copper (Cu) through TGVs, allowing efficient die cooling.

High performance, low-loss transmission lines, on the glass interposer 14, eliminate the need for TX-side or RX-side electrical signal equalizers, further reducing power consumption and complexity. Also, the use of single-ended transmission lines reduces I/O pin count by a factor of ~2×, allowing for correspondingly larger switch matrixes. The switching circuitry 18, 20, 22 can be unpackaged or in a minimally packaged die, directly flip-chip attached to the glass interposer 14. Also, high Q-factor RF passives (i.e., capacitors, inductors) and resistors can be integrated into the glass interposer 14.

In the exemplary embodiment of FIG. 2, the optical transceivers 16 provide 16λ×28 Gbps configuration for an aggregate of 400 Gbps per device (excluding overhead). The optical transceivers 16 can be attached directly to the glass substrate of the glass interposer 14 to provide low-loss RF connections. The optical transceivers 16 may also use high-performance RF sockets or removable (pluggable) forms, e.g., pods, pluggable modules, etc. RF connections between the optical transceivers 16 and CMOS switch dies for the switching circuitry 18, 22 are provided by a high-quality RF redistribution layer on the glass interposer. It is expected that interconnections could be made with single-ended transmission lines while still providing tolerable cross-talk. However, differential transmission lines may be used as frequencies increase.

In various exemplary embodiments, high bandwidth optical transceivers 16 can be used to provide system level interconnect between the modules 10. Again, the optical transceiver 16 optical baud rate can be closely matched to the switching granularity, to minimize signal rate conversions. I/O electrical drivers and clock and data recovery are designed to operate with high-quality RF interconnects with very low loss.

In an exemplary embodiment, the high port count switching apparatus 10 includes a plurality of switching circuits 18, 20, 22 disposed on a glass interposer 14, wherein the plurality of switching circuits 18, 20, 22 each include cross-point switches configured to perform switching at a full signal rate; and a plurality of optical transceivers 16 disposed on the glass interposer 14 and communicatively coupled to the plurality of switching circuits 18, 20, 22. A portion of the plurality of switching circuits 18, 20, 22 are attached to the glass interposer 14, and wherein the plurality of switching circuits 18, 20, 22 is interconnected in a Clos-type switch. The switching circuits may be flip-chip attached, or positioned in glass voids or wells to provide a substantially planar-ized arrangement between the circuit and corresponding on-glass transmission lines. The plurality of optical transceivers 16 is directly attached to the glass interposer 14 to provide low-loss RF connections. The plurality of optical transceivers 16 is attached to the glass interposer 14 through RF sockets. The plurality of optical transceivers 16 and the plurality of switching circuits 18, 20, 22 are interconnected to one another via a RF redistribution layer on the glass interposer 14, wherein the RF redistribution layer has very low loss at high frequencies.

The glass interposer 14 has i) a low dielectric loss, relative to a silicon, organic, and/or ceramic interposer, to allow wideband data transmission, ii) a smooth surface, resulting in smooth metal traces to minimize high-frequency skin effect loss, iii) a coefficient of thermal expansion that is matched to the plurality of switching circuits to minimize stresses, and iv) thermal isolation among the plurality of switching circuits 18, 20, 22 due to thermal conductivity of glass. The glass interposer 14 has thermal isolation among the plurality of switching circuits due to thermal conductivity of glass and high local thermal conductivity by copper through TGVs to allow cooling of the plurality of switching circuits 18, 20, 22. Signals switched through the plurality of switching circuits 18, 20, 22 and the plurality of optical transceivers 16 are at least 25 Gbps such that the glass interposer 14 has low power electronic interconnects, with minimal or no SERDES functionality and without gearboxes down to lower rates. Transmission lines on the glass interposer 14, between the plurality of switching circuits 18, 20, 22 and the plurality of optical transceivers 16, are high-performance, low-loss and do not require transmit side or receive side electrical signal equalizers, and the transmission lines are single ended with a reduced pin count. The glass interposer 14 can include high Q-factor RF passive devices integrated thereon.

Figure 5:
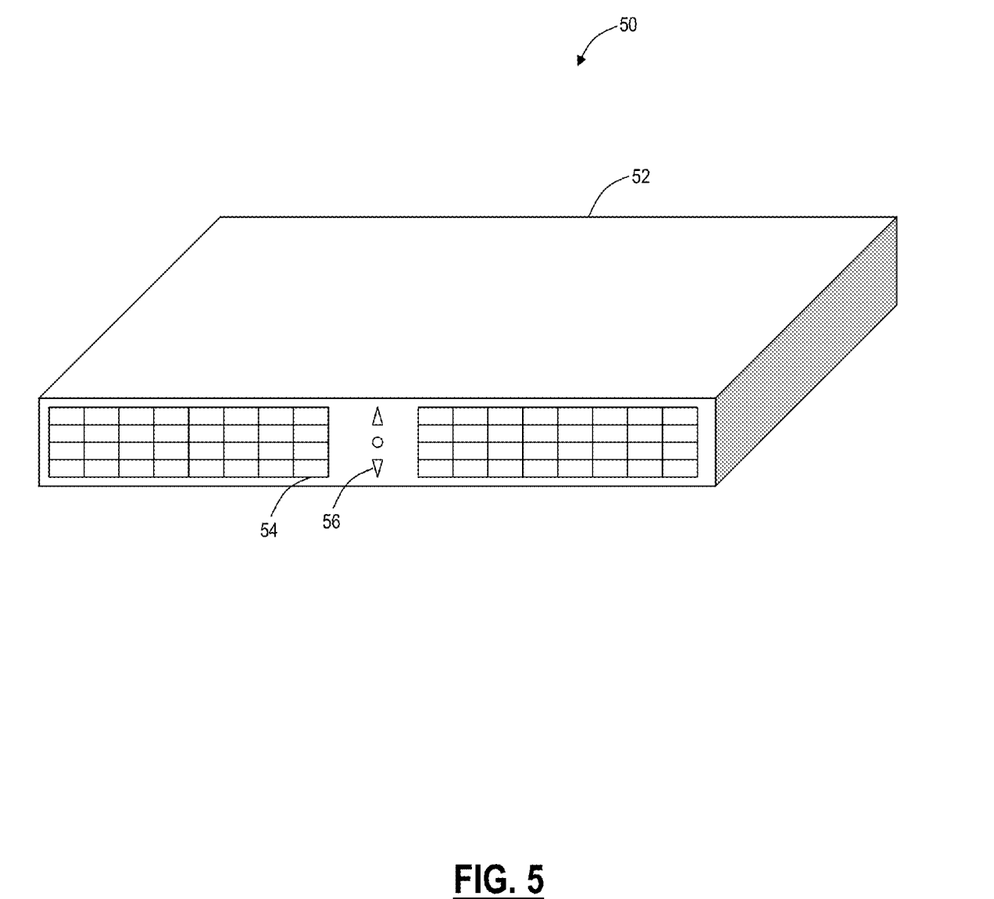
FIG. 5 is a perspective diagram of a high port count switching module.

Referring to FIG. 5, in an exemplary embodiment, a perspective diagram illustrates an implementation of high port count switching module 50. The high port count switching module 50 includes the high port count switching apparatus 10 disposed/contained in a physical housing 52. The PCB 12 can be disposed in the physical housing 52 with the associated optical transceivers 16 coupled to associated optical ports 54 for external connections to the apparatus 10. Also, the physical housing 52 can include maintenance indicators, such as Light Emitting Diodes (LEDs), communication ports 56, and the like. The communication ports 56 can provide data connectivity to the module 50 for Operations, Administration, Maintenance, and Provisioning (OAM&P).

In an exemplary embodiment, the physical housing 52 is a pizza-box design, such as a 1 or 2 Rack Unit (RU) high, rack mountable device. In another exemplary embodiment, the physical housing 52 can be a line card, blade, etc. that is pluggable into a chassis. Other embodiments are also contemplated.

For the optical ports 54, in an exemplary embodiment, the optical transceivers 16 can be photonic integrated modules providing a Wavelength Division Multiplex (WDM) optical input/output (I/O) on a single-mode fiber. Multi-mode fiber (MMF) VCSEL optical I/O is also possible. Specifically, the apparatus 10 and the module 50 contemplate any optical technology that enables high density I/O. As described previously, direct photonic integrated circuit attach to glass is also contemplated. Also, using the glass interposer 14 as the overall substrate material, the substrate material can readily use optical waveguides (glass or polymer waveguides) as well as optical vias in the glass interposer 14 to enhance optical inter-connectivity/connectivity to external fiber, etc. In an exemplary embodiment, one or more optical waveguides can be formed in the glass interposer 14 for connectivity to the optical transceivers 16

Again, in an exemplary embodiment, the high port count switching apparatus 10 and the high port count switching module 50 provides 25.6 Tbps of switching capacity (excluding overhead) with 1024×1024 ports at 28 Gbps per port of flow switching. The high port count switching apparatus 10 and the high port count switching module 50 contemplate various applications including, for example, as a Reconfigurable Electrical Add/Drop Multiplexer (READM), a data center switch, etc. Again, because the switching circuitry 18, 20, 22 switches at full signal rates, the high port count switching apparatus 10 and the high port count switching module 50 do not have SERDES, advanced packet functionality, etc. leading to significantly lower power than TDM and packet switches. Thus, the high port count switching apparatus 10 and the high port count switching module 50 provide extremely high-density flow switching. The high port count switching apparatus 10 and the high port count switching module 50 are not meant to replace TDM and packet switches, but rather to augment them and to operate the internal interconnections, to offload more expensive (from a power perspective) packet and TDM ports.

In an exemplary embodiment, the high port count switching module 50 includes the plurality of switching circuits 18, 20, 22 disposed on the glass interposer 14 disposed on a PCB 12; a plurality of optical transceivers 16 disposed on the glass interposer 14 and communicatively coupled to the plurality of switching circuits 18, 20, 22; and a physical housing 52 containing the PCB 12.

In another exemplary embodiment, a high port count switching method includes providing a plurality of switching circuits 18, 20, 22 disposed on the glass interposer 14, wherein the plurality of switching circuits 18, 20, 22 each include cross-point switches configured to perform switching at a full signal rate; and providing a plurality of optical transceivers 16 disposed on the glass interposer 14 and communicatively coupled to the plurality of switching circuits 18, 20, 22.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A high port count switching module, comprising:
a plurality of switching circuits comprising a first set of switches and a second set of switches each disposed on a glass interposer, wherein the plurality of switching circuits each comprises cross-point switches configured to perform switching at a full signal rate, and wherein the first set of switches are communicatively coupled to the second set of switches through first electrical interconnects on the glass interposer; and
a plurality of optical transceivers disposed on the glass interposer and communicatively coupled to the first set of switches through second electrical interconnects on the glass interposer, and wherein the plurality of optical transceivers are connected to one or more optical waveguides each comprising a fiber formed and integrated into the glass interposer and connectable to each of the plurality of optical transceivers using optical turning structures in and/or on the glass interposer,
wherein the full signal rate is at least 25 Gbps and there is no Serializer-DeSerializer (SERDES) functionality associated with the plurality of switching circuits such that the switching is at the full signal rate of at least 25 Gbps and the plurality of optical transceivers operate at the same full signal rate.

2. The high port count switching module of claim 1, wherein a portion of the plurality of switching circuits are one of i) flip-chip attached to the glass interposer and ii) positioned in wells defined in the glass interposer, and wherein the plurality of switching circuits are interconnected to one another to form a larger switch.

3. The high port count switching module of claim 1, wherein the plurality of optical transceivers is one of i) directly attached to the glass interposer to provide low-loss Radio Frequency (RF) connections and ii) attached to the glass interposer through Radio Frequency (RF) sockets.

4. The high port count switching module of claim 1, wherein the plurality of optical transceivers and the plurality of switching circuits are interconnected to one another via a Radio Frequency (RF) redistribution layer on the glass interposer.

5. The high port count switching module of claim 1, wherein the glass interposer has i) a dielectric loss lower than a dielectric loss of a silicon, organic, or ceramic interposer, to allow wideband data transmission, ii) a surface with metal traces minimizing high-frequency skin effect loss, iii) a coefficient of thermal expansion that is matched to a coefficient of thermal expansion of the plurality of switching circuits to minimize stresses, and iv) thermal isolation among the plurality of switching circuits due to low thermal conductivity of glass, relative to a silicon, organic, or ceramic interposer.

6. The high port count switching module of claim 1, wherein the glass interposer has thermal isolation among the plurality of switching circuits due to low thermal conductivity of glass and high local thermal conductivity by copper Through Glass Vias (TGVs) to allow cooling of the plurality of switching circuits.

7. The high port count switching module of claim 1, wherein the glass interposer provides pitch via and pad connectivity, and line and space (L/S) routing, enabling the high port count electrical signaling, relative to a silicon, organic, or ceramic interposer.

8. The high port count switching module of claim 1, wherein transmission lines on the glass interposer, between the plurality of switching circuits and the plurality of optical transceivers, are high-performance, low-loss and do not require transmit side or receive side electrical signal equalizers, and
wherein the transmission lines are single ended with a reduced pin count.

9. The high port count switching module of claim 1, wherein the glass interposer comprises high Q-factor Radio Frequency (RF) passive devices integrated thereon.

10. A high port count switching apparatus, comprising:
a plurality of switching circuits comprising a first set of switches and a second set of switches configured to perform switching at a full signal rate and each disposed on a glass interposer that is disposed on a Printed Circuit Board (PCB), and wherein the first set of switches are communicatively coupled to the second set of switches through an electrical interconnect on the glass interposer;
a plurality of optical transceivers disposed on the glass interposer and communicatively coupled to the first set of switches through second electrical interconnects on the glass interposer, and wherein the plurality of optical transceivers are connected to one or more optical waveguides each comprising a fiber formed and integrated into the glass interposer and connectable to each of the plurality of optical transceivers using optical turning structures in and/or on the glass interposer; and
a physical housing containing the PCB,
wherein the full signal rate is at least 25 Gbps and there is no Serializer-DeSerializer (SERDES) functionality associated with the plurality of switching circuits such that the switching is at the full signal rate of at least 25 Gbps and the plurality of optical transceivers operate at the same full signal.

11. The high port count switching apparatus of claim 10, wherein a portion of the plurality of switching circuits are one of i) flip-chip attached to the glass interposer and ii) positioned in wells defined in the glass interposer, and wherein the plurality of switching circuits are interconnected to one another to form a larger switch.

12. The high port count switching apparatus of claim 10, wherein the plurality of optical transceivers is one of i) directly attached to the glass interposer to provide low-loss Radio Frequency (RF) connections and ii) attached to the glass interposer through Radio Frequency (RF) sockets or removable forms.

13. The high port count switching apparatus of claim 10, wherein the plurality of optical transceivers and the plurality of switching circuits are interconnected to one another via a Radio Frequency (RF) redistribution layer on the glass interposer.

14. The high port count switching apparatus of claim 10, wherein the glass interposer has i) a dielectric loss lower than a dielectric loss of a silicon, organic, or ceramic interposer, to allow wideband data transmission, ii) a surface with metal traces minimizing high-frequency skin effect loss, iii) a coefficient of thermal expansion that is matched to a coefficient of thermal expansion of the plurality of switching circuits to minimize stresses, and iv) thermal isolation among the plurality of switching circuits due to low thermal conductivity of glass, relative to a silicon, organic, or ceramic interposer.

15. The high port count switching apparatus of claim 10, wherein the glass interposer has thermal isolation among the plurality of switching circuits due to thermal conductivity of glass and high local thermal conductivity by copper Through Glass Vias (TGVs) to allow cooling of the plurality of switching circuits.

16. The high port count switching apparatus of claim 10, wherein transmission lines on the glass interposer, between the plurality of switching circuits and the plurality of optical transceivers, are high-performance, low-loss and do not require transmit side or receive side electrical signal equalizers, and wherein the transmission lines are single ended with a reduced pin count.

17. A high port count switching method, comprising:

providing a plurality of switching circuits comprising a first set of switches and a second set of switches each disposed on a glass interposer, wherein the plurality of switching circuits each comprises cross-point switches configured to perform switching at a full signal rate, and wherein the first set of switches are communicatively coupled to the second set of switches through an electrical interconnect on the glass interposer; and providing a plurality of optical transceivers disposed on the glass interposer and communicatively coupled to the first set of switches through second electrical interconnects on the glass interposer, and wherein the plurality of optical transceivers are connected to one or more optical waveguides each comprising a fiber formed and integrated into the glass interposer and connectable to each of the plurality of optical transceivers using optical turning structures in and/or on the glass interposer, wherein the full signal rate is at least 25 Gbps and there is no Serializer-DeSerializer (SERDES) functionality associated with the plurality of switching circuits such that the switching is at the full signal rate of at least 25 Gbps and the plurality of optical transceivers operate at the same full signal.

* * * * *